United States Patent [19]
Wingerd et al.

[11] 3,787,216
[45] Jan. 22, 1974

[54] POWDERED FAT COMPOSITION

[75] Inventors: Winston Harold Wingerd; Russell Damisch, both of Elgin, Ill.; Marshall Bozzi, Valley Stream, L.I., N.Y.

[73] Assignee: The Borden Company, New York, N.Y.

[22] Filed: Jan. 4, 1971

[21] Appl. No.: 103,871

[52] U.S. Cl. ................................................. 99/139
[51] Int. Cl. ............................................. A23g 3/00
[58] Field of Search ....................................... 99/139

[56] References Cited
UNITED STATES PATENTS
| | | | |
|---|---|---|---|
| 3,295,986 | 1/1967 | Saslaw et al. | 99/139 |
| 3,514,298 | 5/1970 | Noznick | 99/139 |
| 2,913,342 | 11/1959 | Cameron et al. | 99/139 |

*Primary Examiner*—Raymond N. Jones
*Assistant Examiner*—J. M. Hunter
*Attorney, Agent, or Firm*—George P. Maskas; George A. Kap

[57] ABSTRACT

A composition which can be used to prepare a whipped topping by reconstituting it with milk or water after adding sugar, and whipping the mixture, includes, on dry basis, (a) 1–15 percent film-forming substance, (b) 10–60 percent edible fats, (c) 10–60 percent dextrin, (d) 1–12 percent conventional edible emulsifiers, and (e) 0.1–4 percent polyglycerol esters of fatty acids derived from butter. The novel aspect is in the use of the polyglycerol esters which impart excellent whippability and shorter whipping periods.

17 Claims, No Drawings

POWDERED FAT COMPOSITION

This invention relates to compositions adaptable for use as whipped toppings. The novel aspects of the composition is the use of polyglycerol esters of fatty acids derived from butter as a portion of the emulsifier used in the composition.

After being mixed with milk or water, certain compositions acquire properties similar to whipping cream. Although the powder form is preferred, these compositions can also be in the form of a paste. The powders are preferred because they are easy to handle and are more stable since they generally undergo less change during long-term storage. A typical prior art powdered composition includes 30–80 percent fat, 2–35 percent sugar, 5–30 percent non-fat milk solids and 3–20 percent of an emulsifier. Such compositions are generally prepared by forming an aqueous emulsion and subsequently drying the emulsion to provide a powdered product.

Novel product, which can also be described as a dry powder composition, includes emulsifiers, fats, dextrin and a film-forming substance. The product is prepared by melting and mixing together fat and emulsifiers at a food pasteurization and homogenization temperature which is about the melting point of the respective constituents. The preferred temperature range in this instance is from 140°F–160°F. The mixture of fat and the emulsifiers constitutes the first mixture.

A second mixture is prepared by dissolving the film-forming substance and dextrin in water and heating this mixture to a temperature from 140°F–160°F. The two mixtures are combined with mixing and the resulting mixture is homogenized to an emulsion which is then dried in any convenient manner, such as spray drying. Whipped topping is prepared by adding 20–35 gms of sugar to 28 gms of powder composition and reconstituting the mixture with 3 to 5 ounces of milk or water by means of whipping.

Emulsifier used in preparing the product is composed of two parts: the first being polyglycerol esters of fatty acids derived from butter and the second, includes any other conventional emulsifiers suitable for food use.

In order to produce a product which can be used to make a whipped topping having high overrun and good stability, it is essential that 0.1–4 percent, based on dry composition, of polyglycerol esters of fatty acids derived from butter be included in the composition. For purposes of simplicity, the polyglycerol esters of fatty acids derived from butter will hereinafter be referred to as polyglycerol butterate. Preferred amount of polyglycerol butterate is in the range of 0.5–2 percent, based on the total dry composition. Use of the butterate in excess of about 4 percent is impractical for economical reasons as well as flavor. Excess amounts of emulsifiers impart a greasy texture and a soapy flavor to the compositions. These esters are readily prepared from polyglycerols and fatty acids and because of their lipophilic and hydrophylic properties, are used as emulsifiers in foods. Commercial polyglycerols are mixtures of glycerols, diglycerol, triglycerol and higher polyglycerols. Polymer molecule of the polyglycerol butterate contains from 2–10 glycerol units and the acids derived from butter may contain from 4–20, and preferably from 4–18 carbon atoms. Fatty acid composition of a typical butter fat is essentially as follows: 1.5 percent of caprylic acid, 3 percent of capric acid, 4 percent of lauric acid, 12 percent of myristic acid, 25 percent of palmitic acid, 9 percent of stearic acid, 1 percent of arachidic acid, and about 10% of other fatty acids which contain from 4–16 carbon atoms. The fatty acids in butter fat include saturated and unsaturated acids, although there is a high preponderance of saturated acids. The unsaturated fatty acids contain up to two double bonds. A typical butter fat has iodine number in the range of 25–35, saponification value in the range of 216–240 and Wiley melting point in the range of 82°–95° F.

Polyglycerol butterate, suitable for use as emulsifier in the product described herein, can be obtained from Witco Chemical under the designation of Emcol PG-B Polyglycerol Butterate. As was earlier pointed out, presence of polyglycerol butterate in the product is critical since without it it is not possible to prepare a satisfactory whipped topping because the whipped composition is unstable.

Second part of the emulsifier used in preparing the product includes the conventional edible emulsifiers suitable for food use. Amount of the conventional emulsifiers may range from 1–12 percent based on the dry composition, and preferably from 3–9 percent. The conventional emulsifiers include partial as well as complete or diesters of a glycol and higher fatty acids. These esters may be obtained by reacting any dihydric or polyhydric alcohol with fatty acids or fats containing fatty acids. The esters may be prepared by either methylation of fats and the subsequent reaction of the methyl esters with a polyhydric alcohol such as glycol or, by direct esterification of fatty acids. In the preparation of partial esters, the degree of esterification may be complete so that in addition to mono-esters each containing one hydroxyl and one fatty acid group, there may often be diesters having both hydroxyl groups substituted by fatty acids. According to the Cameron U.S. Pat. No. 2,913,342 issued on Nov. 17, 1961, the diesters by themselves do not provide any improved whipping action in a whipped product and for this reason, a mixture of mono and diesters is used. The fatty acids should be saturated and preferably such that in reduction with the glycol, sufficiently low-melting esters are produced whereby a greasy feel in the mouth is avoided. Glycol esters suitable for the present invention may be prepared from fatty acids having chain length ranging from 4–24 and preferably 12–22 carbon atoms. Examples of such glycol esters are partial glycol esters of lauric, myristic, palmitic, stearic, oleic, behenic, linoleic and arachidic acids. The acids can be saturated or unsaturated, containing up to two double bonds. Suitable partial esters mentioned include propylene glycol monostearate, propylene glycol mono-palmitate, propylene glycol mono-laurate and propylene glycol mono-myristate, although some diesters in this series are also present with the partial esters. The higher fatty acids in the above group are preferred due to their stability where elevated temperatures are employed in drying an emulsion containing such partial esters as are derived therefrom. Lower fatty acids generally are not stable either in storage or as a result of the drying operation and consequently, fail to provide the desired emulsifying effect. In the case of propylene glycol mono-laurate, for example, this partial ester, while essentially effective in providing the desired emulsification in the case of whipped topping, also provided a soapy off-taste rendering it unsuitable for use in any flavorful emulsion. Other glycols which can be employed as the glycol portion of the ester include the polyoxyethylene glycols which contain up to 20 ethylene units in the polymer, butylene glycol, dipropylene glycol, diethylene glycol and the polymers of the various simple glycols.

Although the Cameron patent states that the diesters by themselves do not provide an improved result, the product described therein can be produced using the diester emulsifiers. In addition to the emulsifiers disclosed in the Cameron patent, other examples include diesters disclosed by the Cameron patent, acetylated tartaric acid esters, sodium steroyl 2-lactolate, sorbitol esters, propylene glycol lactostearate and monoglycerides and diglycerides. The fatty acid group or groups in the mono-glycerides and diglycerides contain from 12–20, and preferably from 14–18 carbon atoms with various degrees of saturation, although the fatty acid groups are predominently unsaturated. With reference to the unsaturated fatty acid groups, substantially all of these groups contain one double bond.

The polyhydric alcohols, which are reacted with fatty acids to produce the emulsifiers, include alcohols containing two hydroxy groups, such as ethylene glycol, propylene glycol, trimethylene glycol, tetramethylene glycol, hexamethylene glycol; alcohols containing three hydroxy groups, such as glycerol; alcohols containing four hydroxy groups, such as erythritol; alcohols containing five hydroxy groups, such as arabitol and its stereoisomer xylitol; hexahydric alcohols such as sorbitol and its stereoisomers dulcitol and mannitol; cyclic pentahydric alcohols such as quercitol; and cyclic hexahydric alcohols such as inositol.

The polyhydric alcohols, preferably unsubstituted, contain 2–6 and preferably 2–4 carbon atoms and can be either saturated or unsaturated, although they are preferably saturated. As is apparent from above examples, these alcohols may contain from 2–6, and preferably from 2–3 hydroxyl groups.

The conventional edible emulsifiers are selected from esters containing 6–30, and preferably 6–28 carbon atoms per molecule.

Edible fats in the amount of 10–60 percent, based on dry composition, are also incorporated in the product. These edible fats contain fatty acids having from 4–26, and preferably 8–22 carbon atoms. Examples of suitable fats include coconut oil, soy oil, cotton seed oil, peanut oil, palm oil, hydrogenated vegetable oil having an average melting point of from 70°F–120°F and preferably from 90°–100°F, and edible animal fats having a melting point in the same range as the hydrogenated vegetable oil. Most of these fats will fall in the melting point range of 70°–120°F. saponification value in the range of 180–270 and iodine number which can range from a low of 8–12 for coconut oil to a high of 125–140 for soy bean oil. Fats and oils are mainly triglycerides of fatty acids.

Other component in the preparation of the product is a film-forming substance used in amount of 1–15 percent, based on dry composition, and preferably 4–10 percent. Examples of such film-forming substances are sodium caseinate, whey solids, partially hydrolized fish protein, buttermilk solids, whole eggs, egg yolks, skim milk solids, neutral water soluble soy protein derivatives, egg albumin, gelatin, lactalbumin, lactalbumin phosphate and soy protein. These proteinacious materials should be dispersable in the aqueous phase of the reconstituted dry emulsion and they must have the ability to embibe water and form a foamed structure. This substance is water soluble and is added for the purpose of forming a film around fat globules. It was found that the smaller the fat globules in the emulsion the better the emulsion will be. It appears that the film-forming substance, together with liquid dextrin, improves whippability of the whipped topping.

Although the presence of liquid dextrin is not absolutely essential, it is added to improve whippability. The amount of dextrin solids varies from 10–60 percent, based on dry composition. Dextrin is a water-soluble, low molecular weight starch with a dextrose equivalent of 8–25, and preferably 10–22. Dextrose equivalent is the measure of chemical modification of a starch, dextrose having a dextrose equivalent of 100. Dextrin includes hydrolized starch and hydrolized cereal solids. Any starch hydrolized by acid, enzyme or dry heat can be used. Examples are corn starch, sorghum or milo starch, potato starch, tapioca and wheat starch. Liquid dextrin solids which have not been previously dried are preferred to powdered dextrin. Dextrin should be used in solution form. It is commerically available in aqueous solutions of 60–75 percent solids concentration from Clinton Corn Products. Variation in the amount of liquid dextrin used is at the expense of the fats, and vice versa.

Another optional ingredient is lecithin which may be used up to 2 percent, and preferably up to 1 percent to provide a finer texture to a whipped product. It is used for essentially the same purpose as the lower melting mono-glycerides to invert the emulsion from oil-in-water to water-in-oil. This change is desirable since water-in-oil emulsion is very stiff and provides additional stability to the whipped topping. Lecithin appears to emulsify the fat phase of the reconstituted dry emulsion in the form of discreet emulsified globules whereby the fat is ideally distributed in the product. When lecithin is employed, the whip is finer and smoother and is more stable as evident by the body and peaking provided. The term lecithin, as used herein, is intended to mean phosphatide composition derived from materials such as soy bean, corn, cotton seed, peanut, egg yolks, liver and the like. containing lecithin in various degress of purity. Also, phosphatides modified by various processes such as hydroxylation or phosphorylation, may be employed. The most preferred form of lecithin is a vegetable phosphatide which in addition to phosphatide material has an oleaginous carrier, such as soy bean oil or cocoa butter. It is desirable for the purpose of the present invention that the lecithin be highly water dispersable but at the same time, have a sufficient emulsification power for the fat phase of the system.

The invention is further illustrated by the following examples. In all of the examples which follow, the spray dried product was maintained at room temperature for two days to allow the fat crystals to equilibrate to room temperature.

EXAMPLE I

In this example, three different samples of a powdered product were prepared. The ingredients of samples A, B and C are given below.

|  | A | B | C |
|---|---|---|---|
| hydrogenated vegetable fat (92°F MP) | 35% | 35% | 34% |
| hydrogenated vegetable fat (110°F MP) | 8 | 8 | 8 |
| dextrin (20-22 DE) 73% solids | 40 | 40 | 40 |
| sodium caseinate | 8 | 8 | 8 |
| propylene glycol lactostearate (99°F MP) | 4 | — | 8 |
| distilled monoglyceride, 154-158°F MP | 2 | 4 | — |
| distilled monoglyceride, 136-144°F MP | 2 | 4 | — |
| polyglyceride esters of fatty acids derived from butter | 1 | 1 | 1 |
|  | 100% | 100% | 100% |

The powdered products were prepared by melting and mixing together the fats and emulsifiers at about 160°F to form a first mixture. Dextrin and sodium caseinate were dissolved in 100 parts by weight of water and heated to 140°F, to form a second mixture. The two mixtures were combined with simple mixing and homogenized at 500 psi in the second stage valve and 2000 psi on the first stage valve. The emulsion was fed directly to a spray drier operating at an inlet temperature of 320°F and an outlet temperature of 200°F. The dry powder was cooled immediately and quickly to 55°F and thereafter stored at room temperature.

EXAMPLE II

Procedure of Example I was followed in preparing spray dried products containing the following ingredients:

| Ingredients | Wet Wt. | Dry Wt. | % on dry basis |
|---|---|---|---|
| hydrogenated vegetable oil (Wecotop IC, Drew Chemical) |  | 860.0 | 43.0 |
| liquid dextrin, 73% solids (Clinton Corn Products) | 1095.0 gm | 800.0 | 40.0 |
| sodium caseinate (Land O' Lakes) |  | 160.0 | 8.0 |
| propylene glycol lactostearate (Durlac 300, Durkee) |  | 80.0 | 4.0 |
| distilled monoglycerides (Myverol Type 18-07, DPI) |  | 40.0 | 2.0 |
| distilled monoglycerides (Myverol Type 18-30, DPI) |  | 40.0 | 2.0 |
| polyglycerol butterate (Emcol PG-B, Witco Chemical) |  | 20.0 | 1.0 |
| water | 2400.0 | — | — |
|  |  | 2000.0 gm | 100.0% |

28 grams of the spray dried product and 28.7 grams of sucrose sugar were whipped for 2 minutes with 118 grams of cold milk. Density of the whipped topping was 2.453 pounds per gallon and the overrun, 3.48. Flavor and stiffness of the product was good. The density of the whipped topping was rechecked after five days and was found to be 2.400 pounds per gallon.

EXAMPLE III

This example is characterized by the absence of the polyglycerol butterate. The procedure in Example I was followed to prepare a spray dry product having the following ingredients:

| | Wet Wt. | Dry Wt. | % |
|---|---|---|---|
| hydrogenated vegetable oil (Wecotop IC, Drew Chemical) |  | 860.0 gm | 43.0 |
| liquid dextrin, 73% solids (Clinton Corn Products) | 1123 gm | 820.0 | 41.0 |
| sodium caseinate (Land O' Lakes) |  | 160.0 | 8.0 |
| propylene glycol lactostearate (Durlac 300, Durkee) |  | 80.0 | 4.0 |
| distilled monoglycerides (Myverol Type 18-07, DPI) |  | 40.0 | 2.0 |
| distilled monoglycerides (Myverol Type 18-30, DPI) |  | 40.0 | 2.0 |
| water | 2400.0 | — | — |
|  |  | 2000.0 gm | 100.0% |

In preparing the whipped topping, 28.0 grams of the spray dried product and 28.7 grams of sucrose sugar were whipped for 2 minutes with 4 ounces of cold milk weighing 118 grams. Density of the whipped topping was 3.180 pounds per gallon and the overrun was 2.68. The flavor was good, but stiffness and whip-up time were very poor. When rechecked after five days, the density was 3.180 pounds per gallon.

EXAMPLE IV

Here again, procedure of Example I was followed to prepare a spray dried product containing the following ingredients:

| | Wet Wt. | Dry Wt. | % |
|---|---|---|---|
| hydrogenated vegetable oil | | 860.0 gm | 43.0 |
| (Wecotop IC, Drew Chemical) | | | |
| liquid dextrin, 73% solids | 1014.0gm | 740.0 | 37.0 |
| (Clinton Corn Products) | | | |
| sodium caseinate | | 160.0 | 8.0 |
| (Land O' Lakes) | | | |
| propylene glycol lactostearate | | 80.0 | 4.0 |
| (Durlac 300, Durkee) | | | |
| distilled monoglycerides | | 40.0 | 2.0 |
| (Myverol Type 18-07, DPI) | | | |
| distilled monoglycerides | | 40.0 | 2.0 |
| (Myverol Type 18-30, DPI) | | | |
| polyglycerol butterate | | 80.0 | 4.0 |
| (Emcol PG-B, Witco Chemical) | | | |
| water | 2300.0 | — | — |
| | | 2000.0 gm | 100.0% |

The whipped topping was again prepared by whipping 28.0 grams of the product and 28.7 grams of sucrose sugar in 4 ounces of cold milk. Density was 2.24 pounds per gallon and the overrun, 3.77. Whipping time was 2 minutes. The whipped topping had a slight emulsifier flavor and good stiffness. It had the best whip-up time of all the batches. When rechecked after five days, the density was 2.290 pounds per gallon.

EXAMPLE V

Procedure of Example I was followed to prepare a product having the following composition:

| | Wet Wt. | Dry Wt. | % |
|---|---|---|---|
| hydrogenated vegetable oil | | 860.0 gm | 43.0 |
| (Wecotop IC, Drew Chemical) | | | |
| liquid dextrin, 73% solids | 1068 gm | 780.0 | 39.0 |
| (Clinton Corn Products) | | | |
| sodium caseinate | | 160.0 | 8.0 |
| (Land O' Lakes) | | | |
| propylene glycol lactostearate | | 80.0 | 4.0 |
| (Durlac 300, Durkee) | | | |
| distilled monoglycerides | | 40.0 | 2.0 |
| (Myverol Type 18-07, DPI) | | | |
| distilled monoglycerides | | 40.0 | 2.0 |
| (Myverol Type 18-30, DPI) | | | |
| polyglycerol butterate | | 40.0 | 2.0 |
| (Emcol PG-B, Witco Chemical) | | 2000.0gm | 100.0% |

Again, 28 grams of the composition were mixed with 28.7 grams of sucrose sugar and whipped with 4 ounces of cold milk for a period of 2 minutes. Density was 2.290 pounds per gallon and the overrun, 3.73. The flavor was good and the stiffness was very good. The stiffness was the best of all the batches. Recheck of the whipped topping after five days gave a density of 2.200 pounds per gallon.

EXAMPLE VI

A spray dried product containing 6 percent of polyglycerol butterate was prepared pursuant to procedure of Example I. The ingredients were as follows:

| | Wet Wt. | Dry Wt. | % |
|---|---|---|---|
| hydrogenated vegetable oil | | 860.0 gm | 43.0 |
| (Wecotop IC, Drew Chemical) | | | |
| liquid dextrin, 73% solids | 959.0 gm | 700.0 | 35.0 |
| (Clinton Corn Products) | | | |
| sodium caseinate | | 160.0 | 8.0 |
| (Land O' Lakes) | | | |
| propylene glycol lactostearate | | 80.0 | 4.0 |
| (Durlac 300, Durkee) | | | |
| distilled monoglycerides | | 40.0 | 2.0 |
| (Myverol Type 18-07, DPI) | | | |
| distilled monoglycerides | | 40.0 | 2.0 |
| (Myverol Type 18-30, DPI) | | | |
| polyglycerol butterate | | 120.0 | 6.0 |
| (Emcol PG-B, Witco Chemical) | | | |
| water | 2741 gm | — | — |
| | | 2000.0 gm | 100.0% |

The whipped topping was again prepared by whipping 28.0 grams of the product and 28.7 grams of sucrose sugar in 4 ounces of cold milk. Density was 2.620 per gallon and the overrun, 3.26. Whipping time was 2 minutes. The whipped topping had an emulsifier flavor, poor stiffness and poor whip-up time.

Comparing results of Examples I–VI, there was a dramatic difference in the whip-up, density and stiffness of the batches made with and without polyglycerol butterate (PGB). Whipped topping prepared from composition of Example III, which had no PGB, had poor density because it was so high, no stiffness and low overrun. Whipped topping of Example V, containing 2 percent PGB, had best stiffness and very good body and density. Whipped topping of Example IV, containing 4% PGB, had the best whip-up time and good stiffness and density. Whipped topping of Example II, containing 1% PGB, had good density although slightly higher than whipped toppings of Examples IV and V. This topping, Example II, had a better stiffness than that of Example IV but not as good as that of Example V. Whip-up time was approximately same as for the whipped topping of Example V. Results for Example VI, wherein the whipped topping contained 6% PGB, indicate that the topping had an emulsifier flavor, poor stiffness and poor whip-up time.

EXAMPLE VII

In this example, 56.7 grams of a commercially available dry mix containing sugar were used to prepare a whipped topping by whipping the mix with 4 ounces of cold milk. The whipping time was 4 minutes, which is poor. Although flavor was fair, stiffness was poor.

In order to evaluate storage stability and flavor of the novel composition after storage, the following experiment was carried out:

EXAMPLE VIII

Three samples of dry, free-flowing composition, each containing 1 percent of polyglycerol butterate, were stored for six months, each at a different temperature, i.e., first one at room temperature, second one at 45°F, and the third one at 100°F. Three samples of whipped toppings were then prepared from the three samples by admixing 28.0 grams of each sample with 28.7 grams of sucrose sugar and whipping the resulting mixtures with 4 ounces (118 grams) of cold milk. Results of the experiment were as follows:

| whipped topping prepared from sample stored at: | density lbs/gal | overrun | whipping time | stiffness | flavor |
| --- | --- | --- | --- | --- | --- |
| A. room temperature | 2.453 | 3.48 | 2 min. | good | considerable off-flavor |
| B. 45°F | 2.453 | 3.48 | 2 min. | fair | some off-flavor |
| C. 100°F | 2.342 | 3.64 | 2 min. | good | strong off-flavor |

As evident from above table, the density in terms of pounds per gallon was very good at all three storage temperatures. There was a strong emulsifier taste at room temperature and 100°F and some off-flavor at 45°F. The 100°F sample had the best stiffness while the 45°F sample had the worst. The room temperature sample had good stiffness but slightly less than 100°F sample.

The off flavor in above example may be described as "emulsifier taste," although this is not entirely true. Staling of the caseinate in the composition provides a major contribution to the off-flavor development. The use of antioxidants to stabilize fat and emulsifier in the composition may be resorted to in order to obtain adequate shelf-life.

We claim:

1. A dry, free-flowing whipped topping composition comprising
   a. 0.1–4.0 percent, on solids basis, of polyglycerol esters of fatty acids derived from butter,
   b. 1–12 percent, on solids basis, of an edible emulsifier, other than polyglycerol esters derived from butter, selected from the group of conventional edible emulsifiers derived from fatty acids containing 4–24 carbon atoms per molecule,
   c. 10–60 percent, on solids basis, of edible fats derived from fatty acids containing 4–26 carbon atoms and having melting points in the range of 70°–120°F, and
   d. 1–15 percent, on solids basis, of a film-forming substance.

2. The composition of claim 1 wherein amount of polyglycerol esters of fatty acids derived from butter is 0.5–2 percent, the polymeric molecule of said esters containing from 2–10 percent glycerol units, said fatty acids containing 4–20 carbon atoms per molecule; amount of said emulsifier being in the range of 3–9 percent, said derivative fatty acids containing 12–22 carbon atoms; said edible fats contain 8–22 carbon atoms; and amount of said film-forming substance being 4–10 percent; said composition further including 10–60 percent, based on solids basis, of dextrin having a dextrose equivalent of 8–25.

3. The composition of claim 2 wherein the derivative fatty acids of said polyglycerol esters contain 4–18 carbon atoms; and said edible fats having melting points in the range of 90°–110°F, saponification values in the range of 180–270 and iodine numbers in the range of from a low of about 8–12 for coconut oil to a high of about 125–140 for soybean oil.

4. The composition of claim 1 including 10–60 percent, on solids basis, of dextrin having a dextrose equivalent of 8–25.

5. The composition of claim 2 wherein film-forming substance is selected from whey solids, skim milk solids, lactalbumin, lactalbumin phosphate, soy protein, partially hydrolyzed fish protein, buttermilk solids, whole eggs, egg yolk, natural water-soluble soy protein derivatives, egg albumin, gelatin and mixtures thereof.

6. The composition of claim 2 wherein said dextrin is in the form which has not been previously dried.

7. A whipped topping comprising the composition of claim 6, and for each 28 parts by weight thereof, 20–35 parts by weight of sugar and 3–5 ounces of a liquid selected from water and milk.

8. The composition of claim 6 wherein said film-forming substance is selected from whey solids, skim milk solids, lactalbumin, lactalbumin phosphate, soy protein, partially hydrolized fish protein, buttermilk solids, whole eggs, egg yolk, natural water-soluble soy protein derivatives, egg albumin, gelatin and mixtures thereof.

9. The spray dried composition of claim 8 wherein said fats are selected from hydrogenated vegetable oils having a melting point in the range of 90°–110°F and said emulsifier includes about equal weight proportion of monoglycerides and propylene glycol lactostearate.

10. The composition of claim 9 wherein said film-forming substance is sodium caseinate.

11. The composition of claim 6 wherein said dextrin has a dextrose equivalent of 10–22.

12. The composition of claim 11 wherein said emulsifier contains 6–30 carbon atoms.

13. The composition of claim 12 wherein said emulsifier contains 6—28 carbon atoms.

14. The composition of claim 6 wherein said fats are selected from hydrogenated vegetable oils, said emulsifier is a combination of monoglycerides and propylene glycol lactostearate in a weight proportion of about 1:1, and said film forming substance is sodium caseinate.

15. A whipped topping comprising the composition of claim 14, and for each 28 parts by weight thereof, 20–35 parts by weight of sugar and 3–5 ounces of a liquid selected from water and milk.

16. The composition of claim 6 wherein said emulsifier is a reaction product of said fatty acids and polyhydric alcohols containing 2–6 hydroxyl groups and 2–6 carbon atoms per molecule.

17. The composition of claim 16 wherein said polyhydric alcohols contain 2–3 hydroxyl groups and 2–4 carbon atoms.

* * * * *